United States Patent
Chou (10) Patent No.: US 7,782,303 B2
(45) Date of Patent: Aug. 24, 2010

(54) MULTI-DIRECTION INPUT DEVICE

(75) Inventor: Chin-Wen Chou, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 760 days.

(21) Appl. No.: 11/802,208

(22) Filed: May 21, 2007

(65) Prior Publication Data
US 2008/0291157 A1 Nov. 27, 2008

(51) Int. Cl.
*G09G 5/08* (2006.01)
(52) U.S. Cl. ........................................ 345/167; 345/156
(58) Field of Classification Search ......... 345/156–170, 345/184; 361/601; 710/73
See application file for complete search history.

(56) References Cited

U.S. PATENT DOCUMENTS

| | | | |
|---|---|---|---|
| 5,920,307 A * | 7/1999 | Blonder et al. .............. 345/167 |
| 5,920,734 A * | 7/1999 | Holmdahl ..................... 710/73 |
| 6,700,564 B2 | 3/2004 | McLoone et al. |
| 2001/0022108 A1* | 9/2001 | Suzuki ................. 73/862.391 |
| 2003/0025673 A1 | 2/2003 | Ledbetter et al. |
| 2005/0001821 A1* | 1/2005 | Low ............................ 345/169 |
| 2007/0110392 A1* | 5/2007 | Miwa ........................... 386/83 |
| 2007/0247421 A1* | 10/2007 | Orsley et al. ................. 345/156 |
| 2008/0122807 A1* | 5/2008 | Chen et al. .................. 345/184 |

* cited by examiner

*Primary Examiner*—Nitin Patel
(74) *Attorney, Agent, or Firm*—Muncy, Geissler, Olds & Lowe, PLLC (57) ABSTRACT

A multi-direction input device for computers includes a directional wheel, a sliding member and a plurality of electrodes. The directional wheel has a rotational degree-of-freedom and two moving degree-of-freedom to be moved downwards, perform forward rolling, backward rolling and sideward moving thereby to connect corresponding electrodes to generate corresponding signals. In regular conditions the sliding member can be in cooperation with a movable contact to support the directional wheel. When the directional wheel is moved downwards the sliding member drives a corresponding electrode to generate a click signal.

15 Claims, 11 Drawing Sheets

MULTI-DIRECTION INPUT DEVICE

FIELD OF THE INVENTION

The present invention relates to a computer input device and particularly to a multi-direction input device that has a directional wheel movable in multiple directions to allow computer users to do input operations.

BACKGROUND OF THE INVENTION

Computer input devices using a roller such as mice or keyboards are known in the art. U.S. Pat. No. 6,700,564 B2 assigned to Microsoft Co. and U.S. patent publication No. 2003/0025673 A1 disclose an input device which has a roller to allow users to turn the roller with fingers to change pages, scroll text or edit text of documents during browsing the documents on a computer screen. It is especially convenient for the users to browse the documents, search Web pages or zoom/shrink images and skip pages or lines without striking the page down/up keys on the keyboard, or maneuvering the scroll bar on the browsing window through a mouse.

However the conventional roller device is complicated and bulky. Fabrication and assembly are difficult. Manufacturing cost is higher. To shrink the size of electronic products equipped with such a roller input device also is not easy.

SUMMARY OF THE INVENTION

The primary object of the present invention is to provide a multi-direction input device for computers that can provide multi-direction operation and click function.

According to an embodiment of the invention, the multi-direction input device includes a directional wheel, a sliding member and a plurality of electrodes. The directional wheel is supported by the sliding member and a movable contact, and has a rotational degree-of-freedom and two moving degree-of-freedom to allow users to perform click operation, forward rolling, back rolling and sideward moving operations to connect corresponding electrodes to generate corresponding signals.

Another object of the invention is to provide a support structure for roller input devices.

According to an embodiment of the invention, the support structure includes a sliding member and a movable contact. In regular conditions the sliding member and the movable contact jointly support the directional wheel. When the directional wheel is moved downwards an actuation contact on the sliding member is triggered to connect a corresponding electrode to generate a click signal. The directional wheel further has a coaxial gear to drive the movable contact and a corresponding electrode to generate a forward rolling or backward rolling signal while the directional wheel is rotated in the moving direction.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
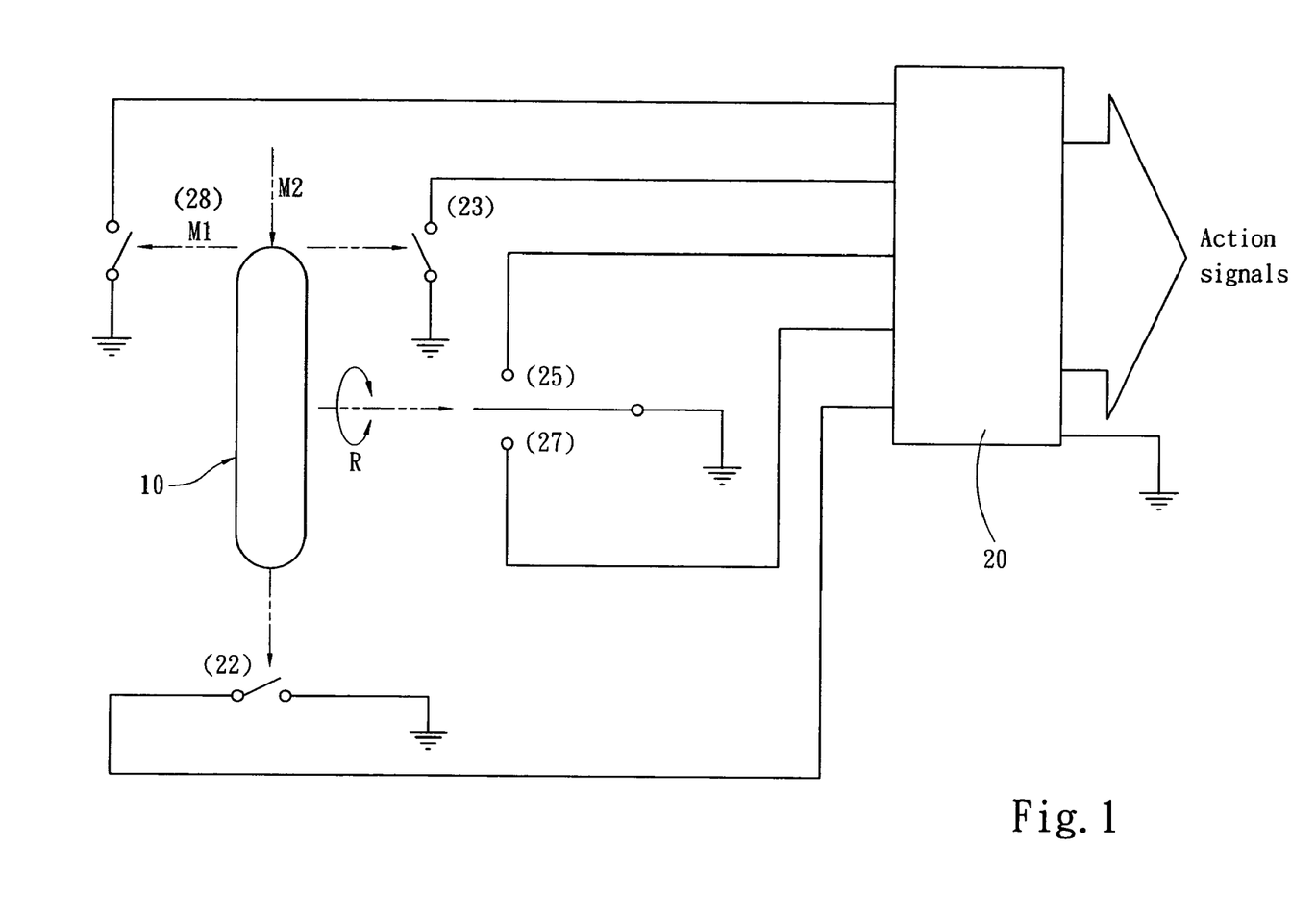
FIG. 1 is a functional block diagram of an embodiment of the invention.
Figure 2A:
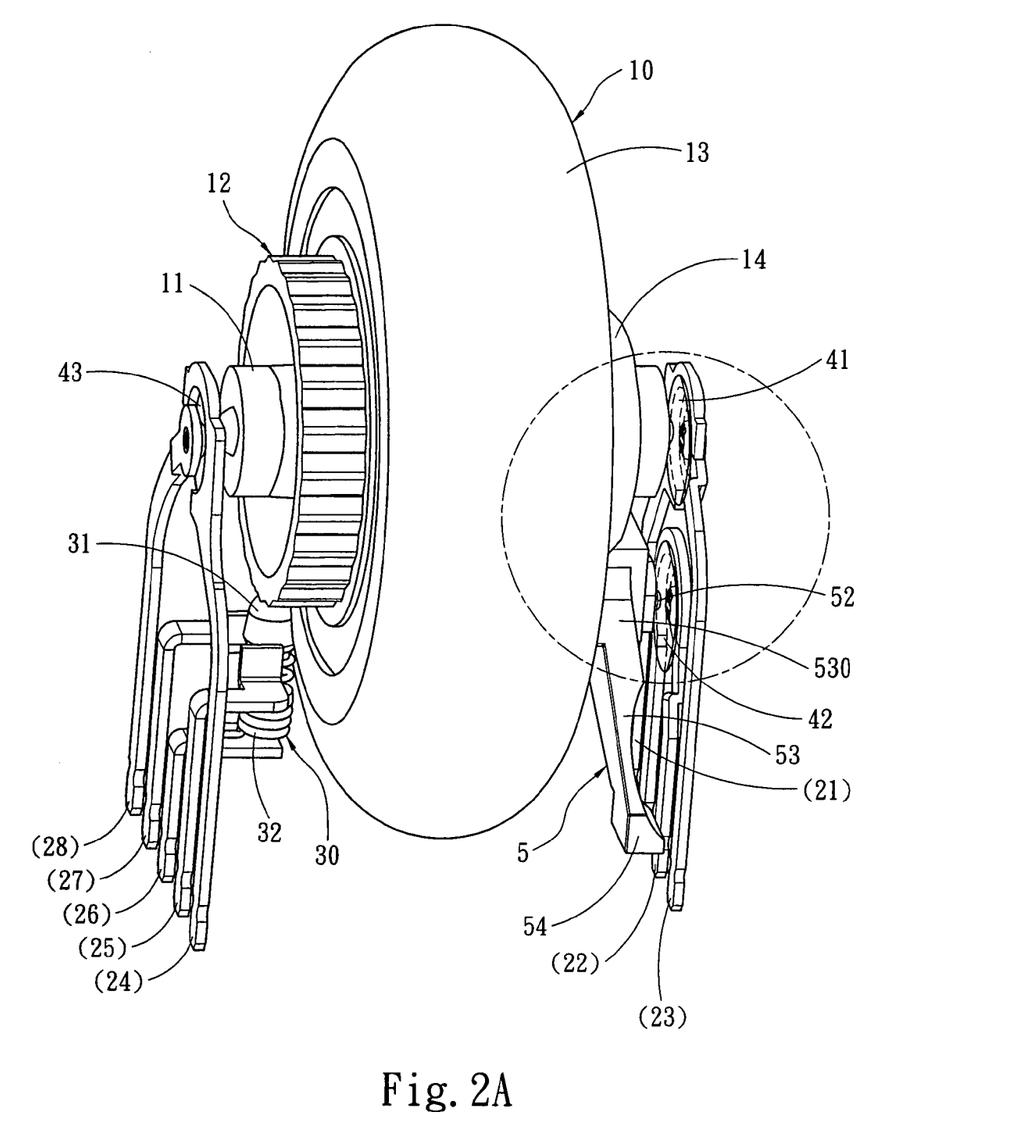
FIG. 2A is a perspective view of an embodiment of the invention.
Figure 2B:
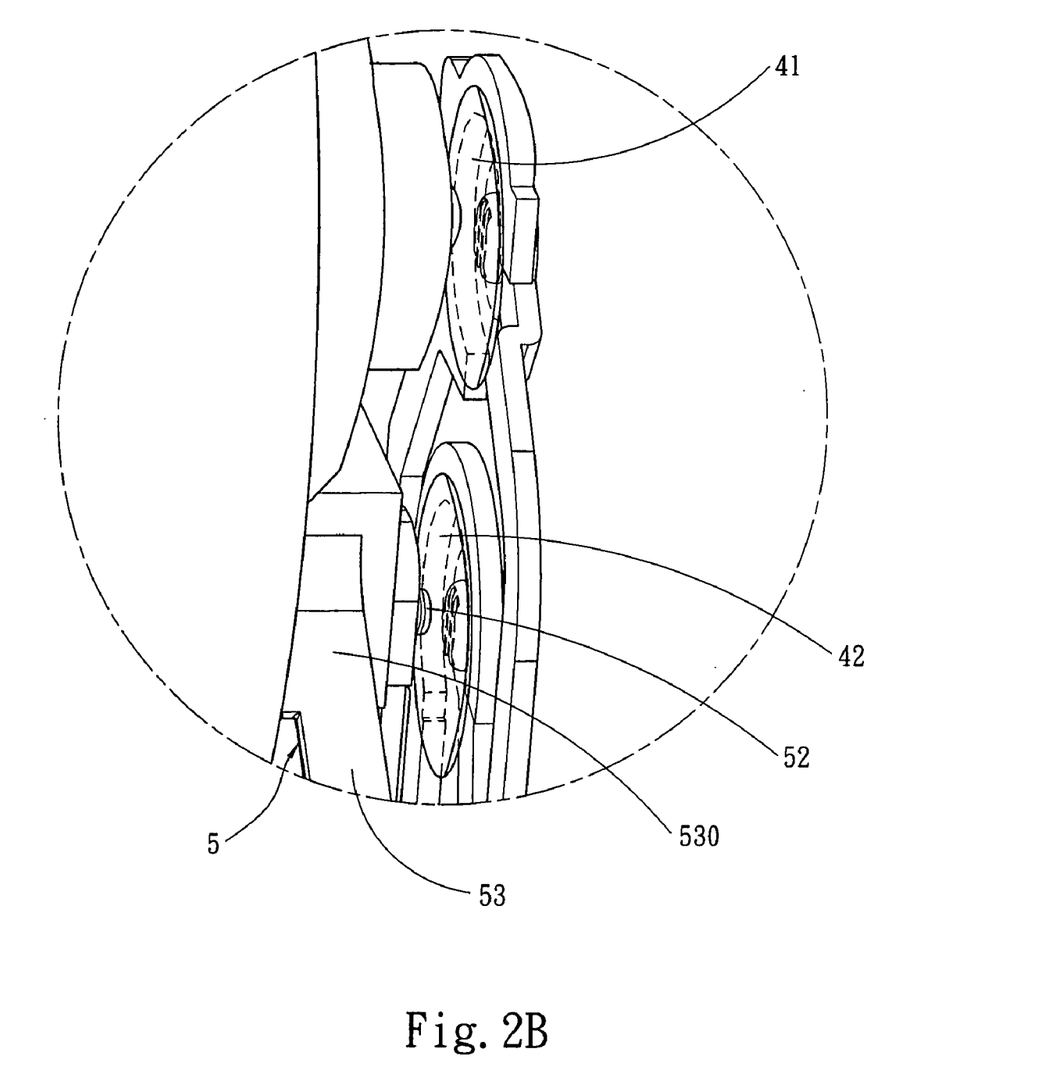
FIG. 2B is a fragmentary enlarged view according to FIG. 2A.
Figure 3:
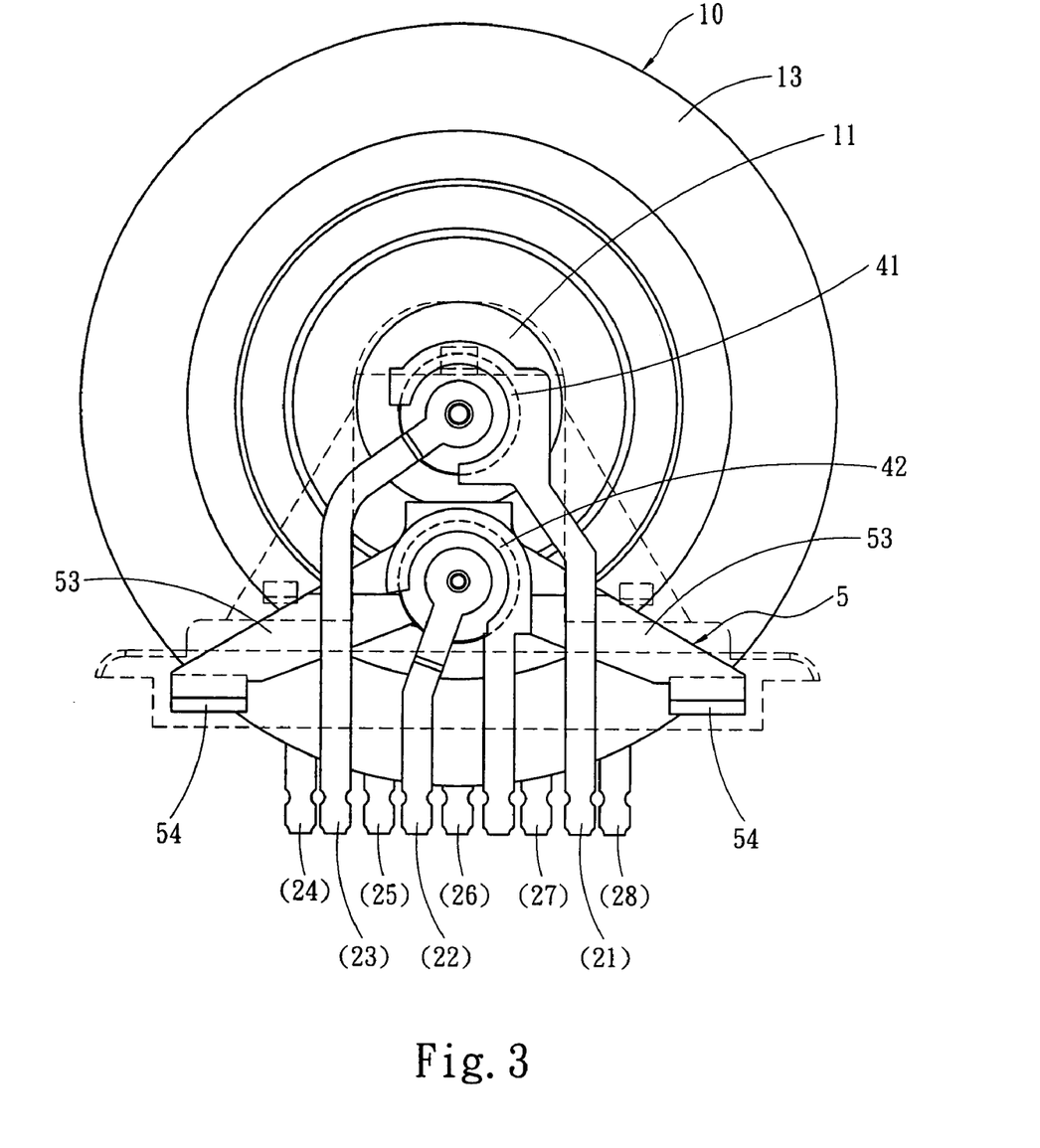
FIG. 3 is a side view of an embodiment of the invention.

The multi-direction input device of the invention includes a directional wheel 10, a sliding member 5 and a plurality of electrodes 21-28. Refer to FIG. 1 for a functional block diagram of an embodiment of the invention. The directional wheel 10 has three-degree-of-freedom, including a rotational degree-of-freedom R (for forward rolling and backward rolling) and two moving degree-of-freedom M1 and M2 (for moving sideward and downward for click operation).

The electrodes are connected to an encoder 20. According to the movement of the directional wheel 10 (including forward rolling, backward rolling, sideward moving and downward clicking) a corresponding electrode (such as electrodes 22, 23, 25, 27 and 28 marked in the drawings) can be connected to form a circuit and trigger the encoder 20 to generate a corresponding action signal.

Figure 4A:
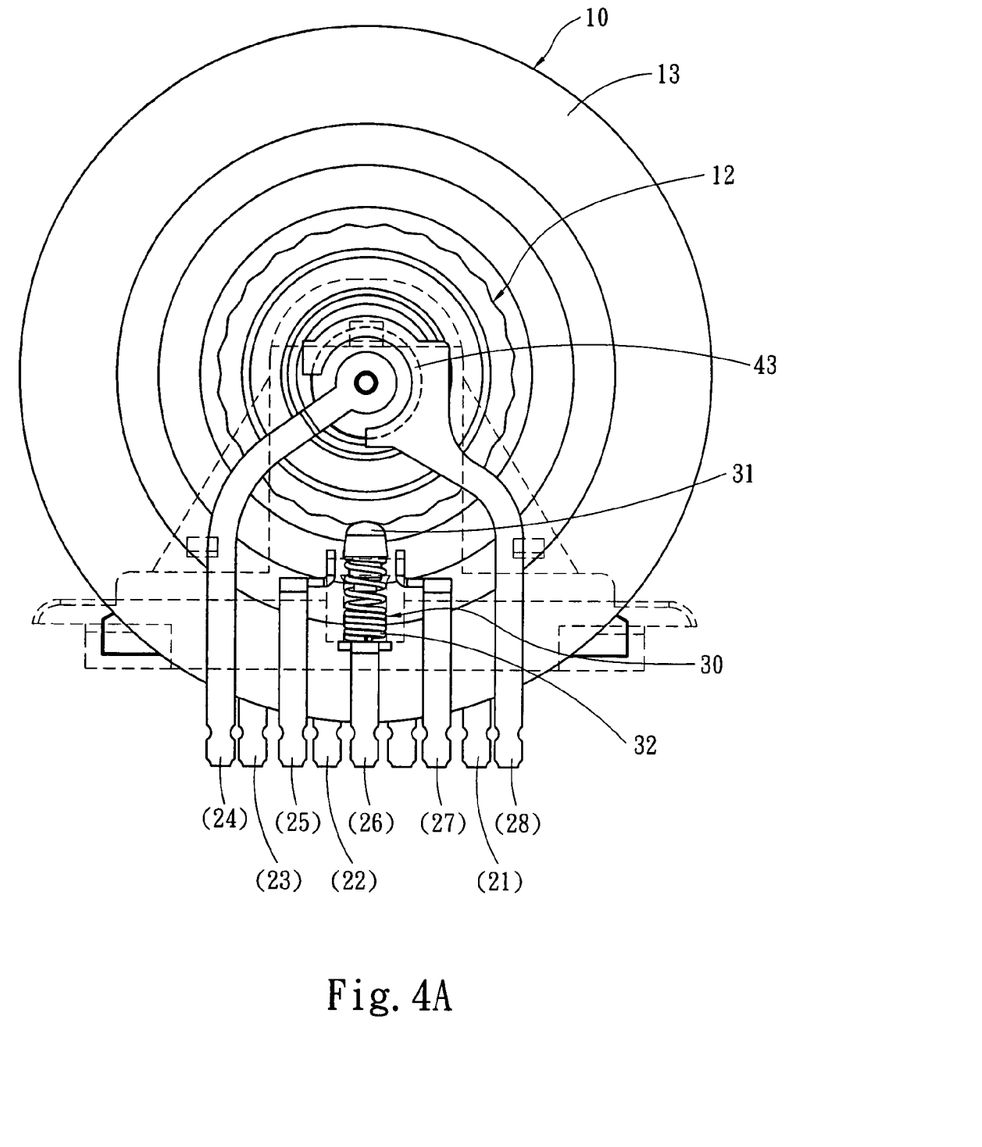
FIG. 4A is another side view of an embodiment of the invention.
Figure 4B:
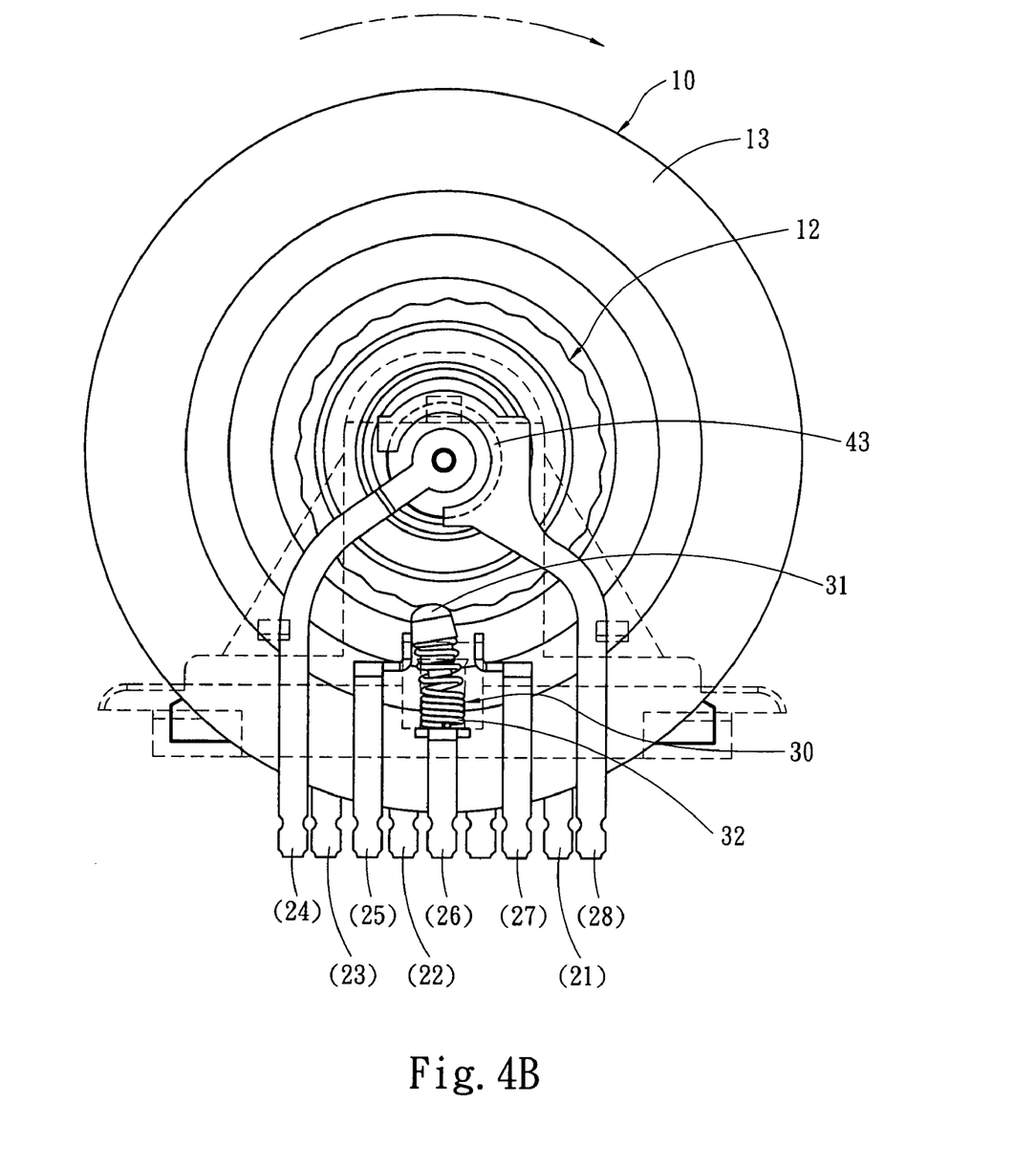
FIG. 4B is a schematic view of an embodiment of a directional wheel of the invention in a rolling condition.

Refer to FIGS. 1, 2A, 2B, and 3 for an embodiment of the invention. The directional wheel 10 has an axle 11, a coaxial gear 12 located at a first side of the directional wheel 10 and a coaxial annular inclined surface 14 located at a second side of the directional wheel 10. The directional wheel 10 further has a peripheral surface 13 to be touched by users to perform operation. There are a fifth electrode 25 and a seventh electrode 27 disposed at the first side of the directional wheel 10. There is a movable contact 30 located between the fifth electrode 25 and seventh electrode 27 that is electrically connected to a sixth electrode 26 (referring to FIG. 4A). The movable contact 30 is conductive and elastic, and has one end electrically connected to the sixth electrode 26 and another end constantly in contact with the gear surface of the coaxial gear 12. When the directional wheel 10 rotates, the gear surface of the coaxial gear 12 moves the movable contact 30 to connect the fifth electrode 25 or seventh electrode 27 depending on the rolling direction of the directional wheel (referring to FIG. 4B). When the directional wheel 10 remains still the movable contact 30 bounces back to a regular position due to its elasticity, and is not in contact with the fifth electrode 25 or seventh electrode 27.

In an embodiment of the invention the movable contact 30 may consist of a metal pin 31 and an elastic element 32 (may be a metal spring) fastened to one end of the metal pin 31. The elastic element 32 has one end fastened to the sixth electrode 26 (may be a common electrode). The metal pin 31 has a top end constantly in contact with the gear surface of the coaxial gear 12. The embodiment of the movable contact 30 previously discussed is not a limitation. It also may be formed directly through a spring, or consist of a metal ring run through by a plastic pin and a metal spring connecting to the metal ring.

There is a second electrode 22 located at the first side of the directional wheel 10 (opposing the coaxial gear 12). The first side also has a first electrode 21 which may be a common electrode. The first electrode 21 has a conductive first elastic reed 41 (to be used by the directional wheel 10 for conduction in a sideward tilting condition) and a second electric reed 42 (to be used by the directional wheel 10 in a downward click condition) (referring to FIGS. 2A and 2B). The second elastic reed 42 has bounce back elasticity. In the regular condition the first elastic reed 41 is not in contact with a third electrode 23, and the second elastic reed 42 is not in contact with the second electrode 22 (referring to FIG. 5B).

Figure 5A:
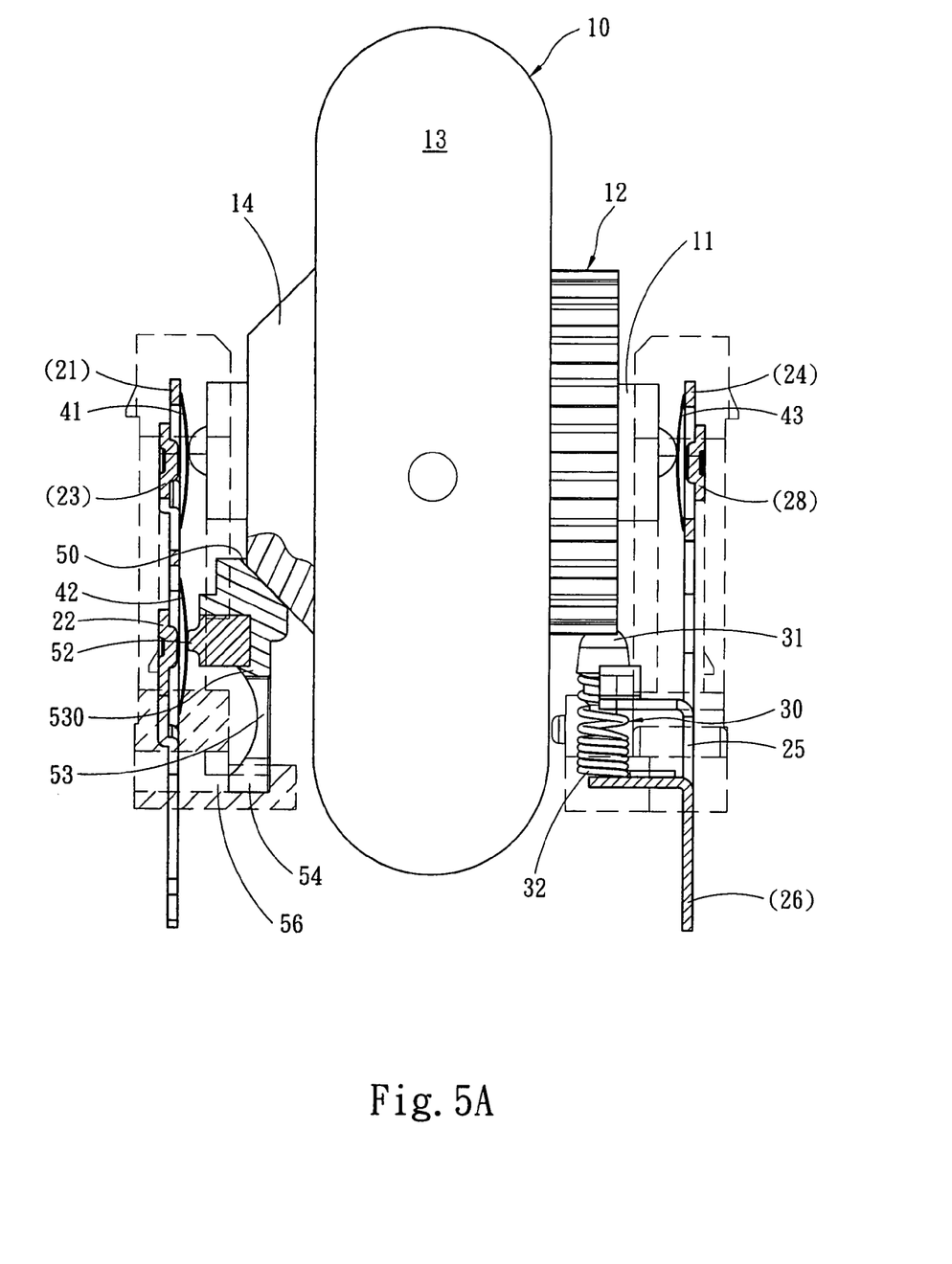
FIG. 5A is a front view of an embodiment of the invention.
Figure 5B:
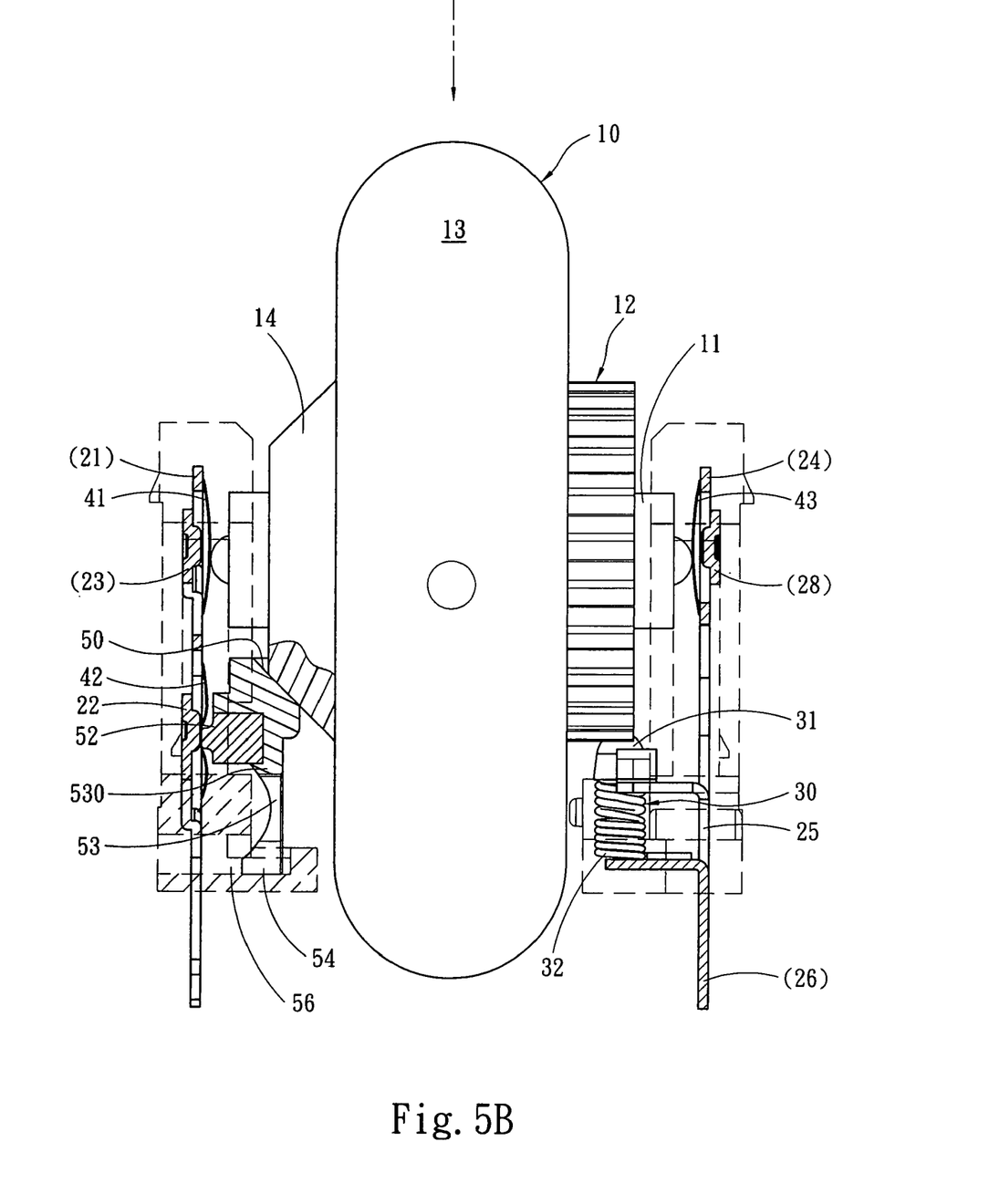
FIG. 5B is a schematic view of an embodiment of the directional wheel of the invention in a downward moving condition.
Figure 6:
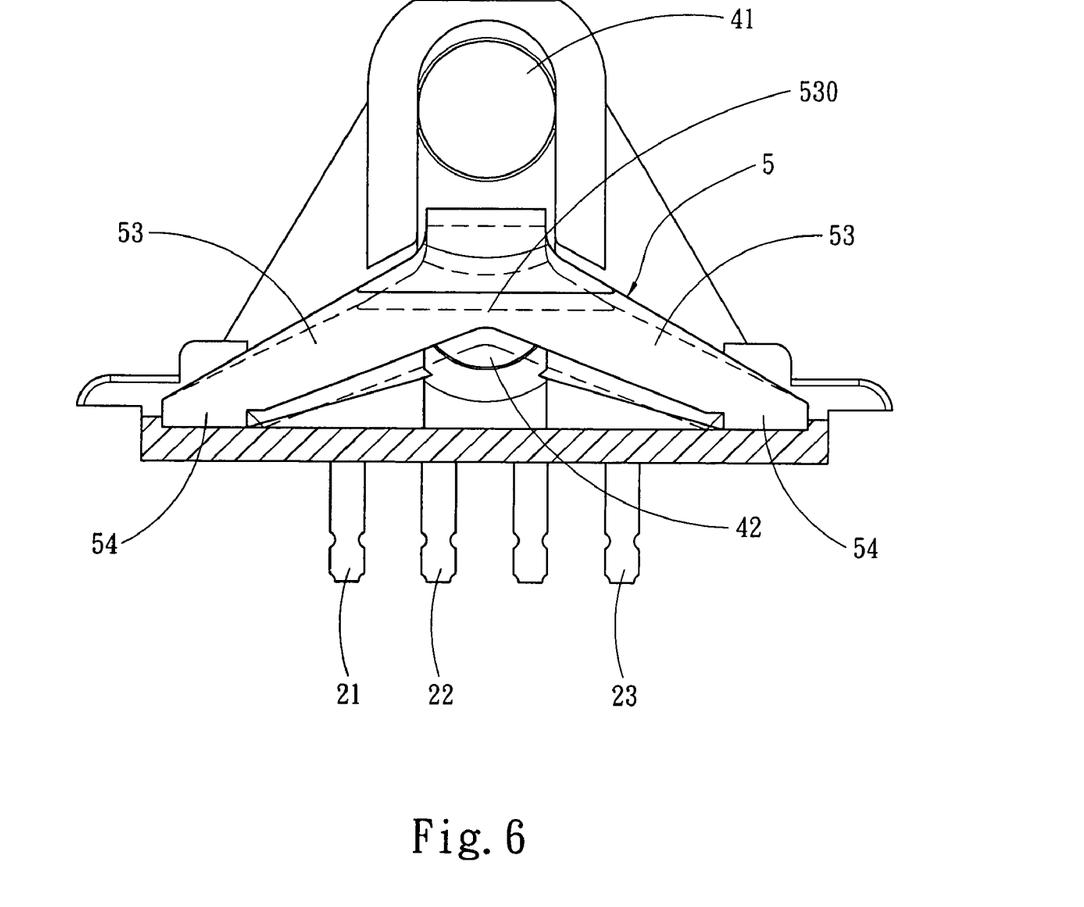
FIG. 6 is a schematic view of an embodiment of a support leg of the invention in a depressed and bounced back condition.

Referring to FIG. 5A, the sliding member 5 is located beneath the first elastic reed 41. When the directional wheel 10 is not operating in the regular conditions, it is supported by the sliding member 5 and the movable contact 30. The sliding member 5 is located at the second side of the directional wheel 10 (opposing the first side of the movable contact 30), and includes an inclined surface 50 corresponding to the coaxial annular inclined surface 14 and an actuation contact 52. The sliding member 5 may be made of metal or plastics. When the directional wheel 10 is moved downwards, the coaxial annular inclined surface 14 is supported by the inclined surface 50 of the sliding member 5. The sliding member 5 further has a flexible support leg 53 at the bottom end. The support leg 53 has a bend spot 530 which serves as a fulcrum for the support leg 53 to be pressed downwards and bounce back when the support leg 53 receives a force at an upper side (referring to FIG. 6). The support leg 53 also has a sliding channel 54 at the bottom that is securely mounted onto a sliding track 56. Through the direction of the sliding track 56 and sliding channel 54 the sliding member 5 can slide reciprocally (referring to FIG. 5B). When the directional wheel 10 is depressed the actuation contact 52 is moved towards the second elastic reed 42 of the first electrode 21 so that the second elastic reed 42 is in contact with the second electrode 22 to form electric connection between the first electrode 21 and the second electrode 22 to trigger the encoder 20 to generate a click signal. After the second elastic reed 42 has received the contact pressure of the actuation contact 52, the flexile force of the support leg 53 at the bottom of the sliding member 5 moves the directional wheel 10 upwards to its original position. Moreover, in the regular condition the sideward moving distance and inclining degree of the inclined surface 50 of the directional wheel 10 determine the spatial gap to be spared between the inclined surface 50 of the sliding member 5 and the coaxial annular inclined surface 14 of the directional wheel 10, or direct contact between them without any spatial gap. Thereby when the directional wheel 10 is tilted towards the second side no erroneous signal is output.

Figure 5C:
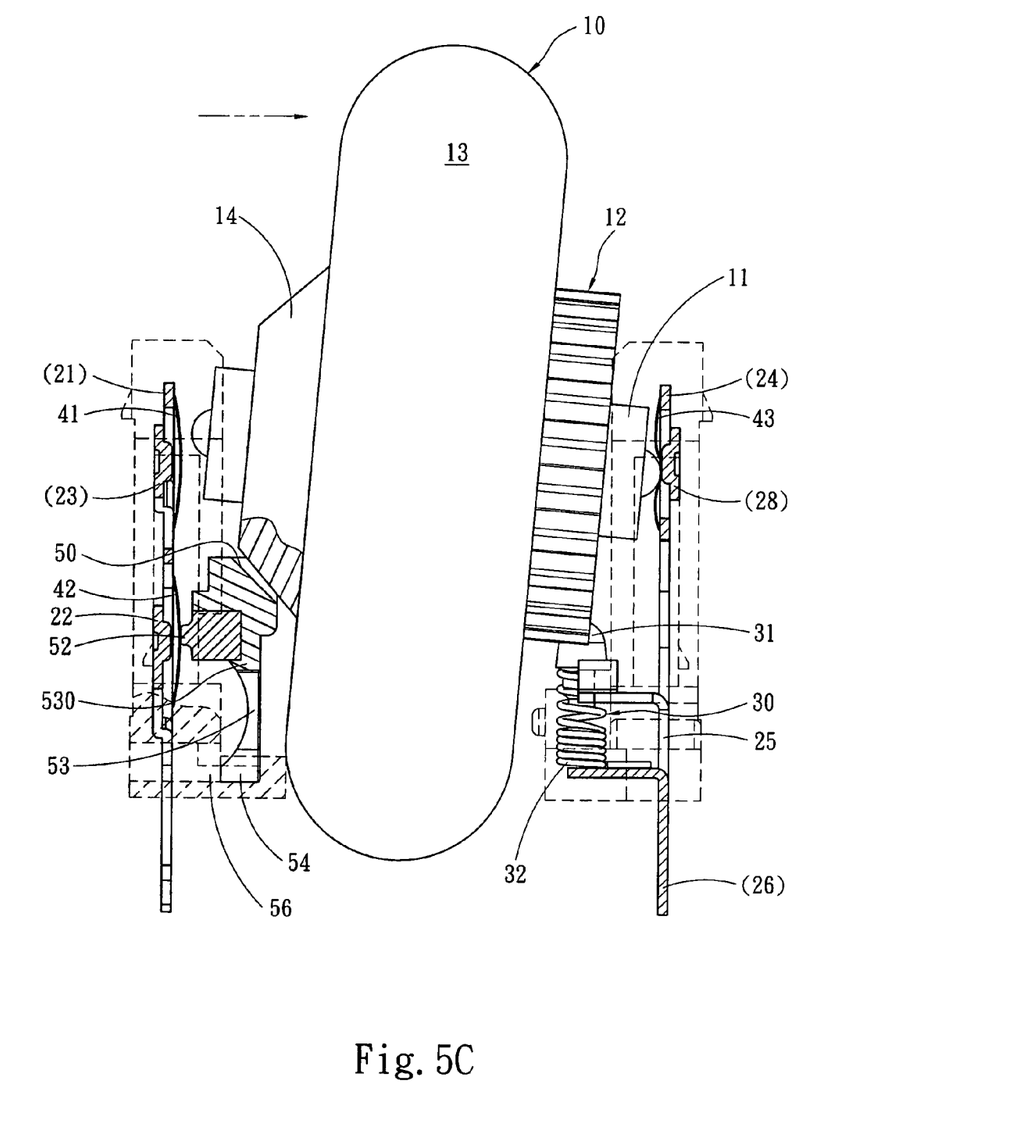
FIGS. 5C and 5D are schematic views of an embodiment of the directional wheel of the invention tilting sideward.
Figure 5D:
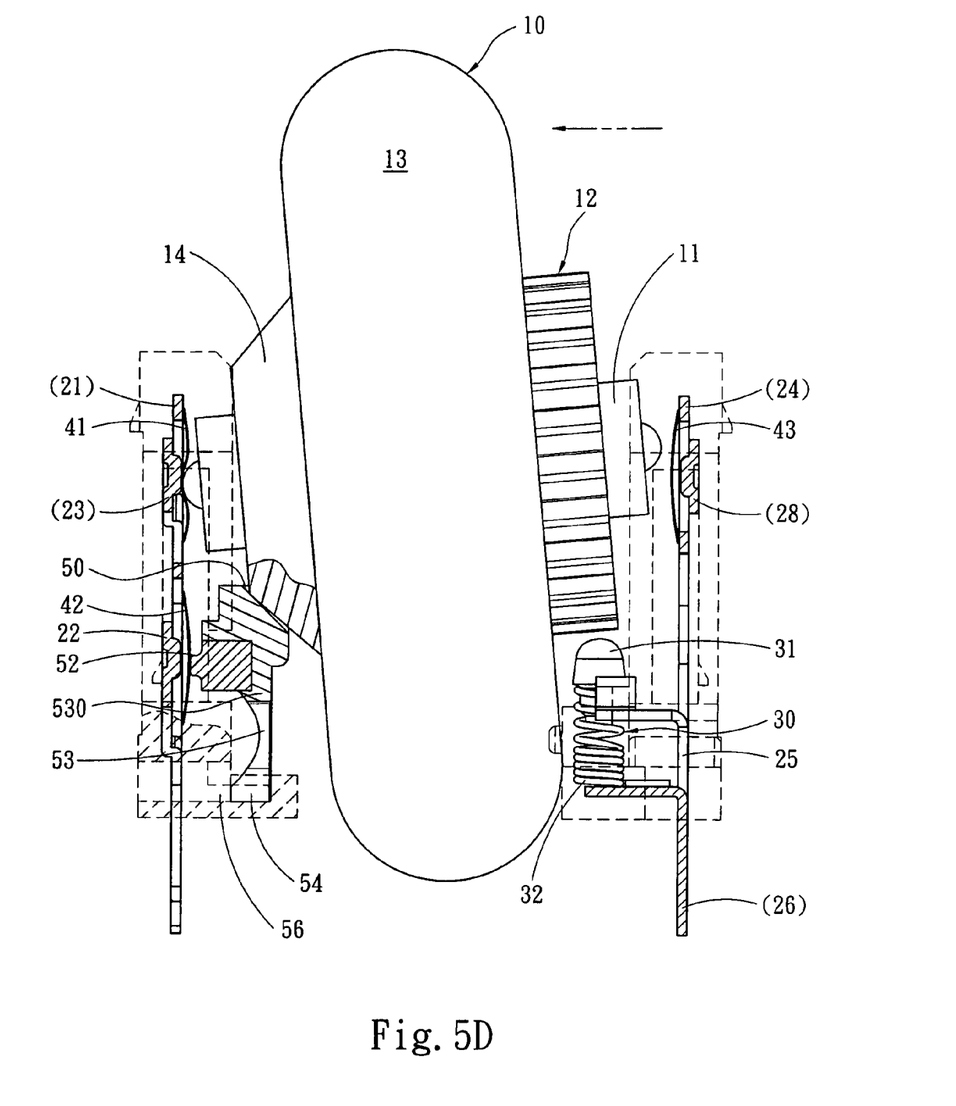

At the first side of the directional wheel 10 there is also a fourth electrode 24 (may be a common electrode) and a conductive third elastic reed 43 which is constantly in contact with the fourth electrode 24. There is an eighth electrode 28 located at the first side of the directional wheel 10 as the fourth electrode 24 does. The third electrode 23 is located at the second side of the directional wheel 10 (opposing the eighth electrode 28). The first elastic reed 41 and third elastic reed 43 are located at outer sides of two ends of the axle 11 (referring to FIG. 5). When the directional wheel 10 is tilted in any direction the end portion of the axle 11 forces the first elastic reed 41 or third elastic reed 43 in contact with the third electrode 23 or eighth electrode 26 so that the third electrode 23 is electrically connected to the first electrode 21 (referring to FIG. 5C), or the eighth electrode 28 is electrically connected to the fourth electrode 24 (referring to FIG. 5D) to trigger the encoder 20 to generate a rightward or leftward signal.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A multi-direction input device, comprising:
    a directional wheel which has an axle, a coaxial gear located at a first side thereof and a coaxial annular inclined surface located at a second side thereof, and a rotational degree-of-freedom for rolling forward and rolling backward and two moving degree-of-freedom for moving sideward and downward to perform click operation;
    a sliding member which is located at the second side of the directional wheel and includes an inclined surface corresponding to the coaxial annular inclined surface such that when the directing wheel is moved downward the sliding member is slid by directing of the coaxial annular inclined surface and the inclined surface; and
    a plurality of electrodes, including
    a first electrode, a second electrode and a third electrode that are located at the second side of the directional wheel such that when the directional wheel is moved downward the sliding member slides to form electric connection between the first electrode and the second electrode; when the directional wheel is moved towards the second side the axle forces the first electrode to form electric connection with the third electrode;
    a fifth electrode, a sixth electrode and a seventh electrode that are located at the first side of the directional wheel, the fifth electrode and the seventh electrode being interposed by a movable contact which is conductive and elastic, and has one end electrically connected to the sixth electrode and another end constantly in contact with a gear surface of the coaxial gear such that in regular conditions the movable contact is not connected to the fifth electrode or the seventh electrode; when the directional wheel rotates the gear surface moves the movable contact to connect the fifth electrode or the seventh electrode; and
    a fourth electrode and an eighth electrode that are located at the first side of the directional wheel such that when the directional wheel is moved towards the first side the axle forces the fourth electrode and the eighth electrode to form electric connection.

2. The multi-direction input device of claim 1, wherein the first electrode is a common electrode and has a conductive first elastic reed, the first elastic reed being located outside one end of the axle, when the directional wheel is moved towards the second side, the axle forces the first elastic reed in contact with the third electrode to form electric connection between the third electrode and the first electrode, in the regular conditions the first elastic reed being not in contact with the third electrode.

3. The multi-direction input device of claim 1, wherein the fourth electrode is a common electrode and has a conductive third elastic reed, the third elastic reed being located outside one end of the axle, when the directional wheel is moved towards the first side, the axle forces the third elastic reed in contact with the eighth electrode to form electric connection between the eighth electrode and the third electrode, in the regular conditions the third elastic reed being not in contact with the eighth electrode.

4. The multi-direction input device of claim 1, wherein the sliding member has an actuation contact to trigger the second electrode.

5. The multi-direction input device of claim 4, wherein the first electrode is a common electrode and has a conductive second elastic reed, the second elastic reed being located outside one end of the actuation contact, when the directional wheel is moved downwards the actuation contact is moved towards the second elastic reed to force the second elastic reed in contact with the second electrode to form electric connection between the first electrode and the second electrode, in the regular conditions the second elastic reed being not in contact with the second electrode.

6. The multi-direction input device of claim 1, wherein the movable contact includes a metal pin and an elastic element fastened to one end of the metal pin, the elastic element having one end connecting to the sixth electrode, the metal pin having a top end constantly in contact with the gear surface of the coaxial gear.

7. The multi-direction input device of claim 6, wherein the elastic element is a spring.

8. The multi-direction input device of claim 1, wherein the movable contact is a spring which has one end connecting to the sixth electrode and a top end constantly in contact with the gear surface of the coaxial gear.

9. The multi-direction input device of claim 1, wherein the sliding member has a flexible support leg at a bottom end thereof, the support leg having a bend spot to serve as a fulcrum to allow the support leg to be depressed downward and bounce back when the support leg receives a force at an upper side.

10. The multi-direction input device of claim 9, wherein the support leg has a sliding channel at the bottom thereof.

11. The multi-direction input device of claim 10, wherein the sliding channel is securely mounted onto a sliding track to direct the sliding member to slide reciprocally.

12. An input device to trigger an encoder to generate a click signal, comprising:
a directional wheel which is movable downwards and has an axle and a coaxial annular inclined surface;
a sliding member which has an inclined surface corresponding to the coaxial annular inclined surface and an actuation contact; when the directional wheel is moved downwards the sliding member slides by jointed directing of the coaxial annular inclined surface and the inclined surface; and
a first electrode and a second electrode located at a same side of the directional wheel, the first electrode and the second electrode being electrically connected to the encoder, the first electrode having a conductive second elastic reed, the second electrode being located at an outer side of one end of the actuation contact, when the directional wheel is moved downwards and the sliding member slides the actuation contact is moved towards the second elastic reed to force the second elastic reed in contact with the second electrode such that the first electrode and the second electrode form electric connection to trigger the encoder to generate a click signal, in regular conditions the second elastic reed being not in contact with the second electrode.

13. The input device of claim 12, wherein the sliding member has a flexible support leg at a bottom end thereof, the support leg having a bend spot to serve as a fulcrum to allow the support leg to be depressed downward and bounce back when the support leg receives a force at an upper side.

14. The input device of claim 13, wherein the support leg has a sliding channel at the bottom thereof.

15. The input device of claim 14, wherein the sliding channel is securely mounted onto a sliding track to direct the sliding member to slide reciprocally.

* * * * *